May 13, 1969 G. F. CAHILL ET AL 3,444,281

PROCESS OF PREPARING CELLULAR CLOSURE GASKETS

Filed April 21, 1966

United States Patent Office 3,444,281
Patented May 13, 1969

3,444,281
PROCESS OF PREPARING CELLULAR
CLOSURE GASKETS
Gerald F. Cahill and James A. Avtges, Belmont, and
Donald D. Hundt, Arlington, Mass., assignors to W. R.
Grace & Co., Cambridge, Mass., a corporation of
Connecticut
Filed Apr. 21, 1966, Ser. No. 544,302
Int. Cl. B29d 31/00
U.S. Cl. 264—45                                    4 Claims

ABSTRACT OF THE DISCLOSURE

Transparent cellular gaskets are formed in container closure elements by depositing into a container closure a plastisol having a viscosity between about 250 and 2000 centipoises and containing a blowing agent, rotating the closure containing the deposit at a speed ranging between about 1500 and 5000 r.p.m. whereby a thin film is formed over the panel portion of the closure integrated with a thick annular ring and fluxing the plastisol in the closure. The fluxed gasket has a transparent panel portion and an overall void volume not exceeding 45%.

Figure 1:
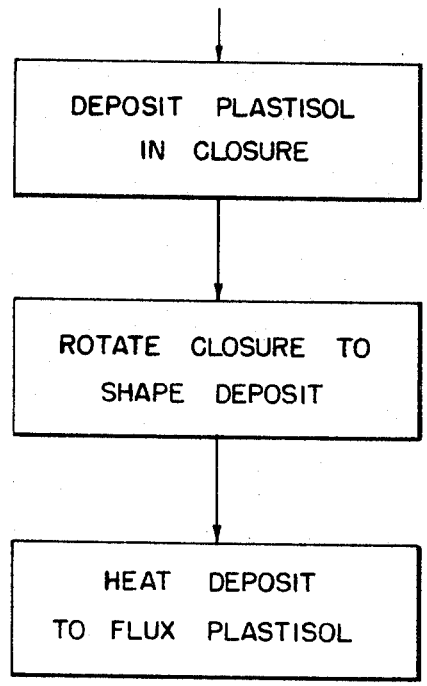

This invention relates to a method of forming fluxed cellular plastisol gaskets for container closures, especially crowns.

Basically, plastisols comprise a dispersion of finely divided thermoplastic resin particles in a liquid non-volatile plasticizer in which the resin is insoluble or only very slightly soluble at room tempearture. At elevated temperatures the resin is substantially completely solvated by the plasticizer so that a homogeneous solution is obtained which is transformed into a rubbery thermoplastic mass upon cooling.

In addition to the basic ingredients, plastisol compositions may contain pigments, fillers, stablizers, wetting agents, thickeners and other conventional compounding ingredients. When a fluxed cellular product is desired, a gas may be dispersed in the plastisol or a was-evolving agent, i.e. blowing agent may be added which decomposes at the fluxing temperature of the composition.

Plastisols have been widely used in the manufacture of sealing gaskets for container closures including crown caps where the gasket comprises an over-all liner coextensive with the inside surface of the closure panel. In the spin-lining method of forming gaskets for crowns and other closures, a measured amount of plastisol is deposited in an inverted closure shell, and the closure containing the plastisol deposit is rotated at high speeds to cause the deposit to spread over the inner surface of the closure panel. Thereafter, the deposit is heated at a temperature and for a time sufficient to completely flux the composition.

In forming spun-lined gaskets for crown closures having advertising or other matter lithographed on the inner surface of the closure panel, it is necessary to employ plastisol compositions which are transparent upon fluxing so that the printed matter on the closure panel will be visually discernable through the overlying portion of the fluxed gasket. Because of the restrictions as to acceptable clarity and transparency of the panel portion of liners for this use, fluxed cellular gaskets as conventionally prepared have been unsuitable. With such gaskets the printed matter is badly obscured, if not obliterated, even in the absence of fillers, pigments and other compounding ingredients which give translucent or opaque products.

The use of cellular gaskets, however, is generally preferred in crowns for use on pressurized packs in order to ensure good sealing performance despite irregularities in the glass finish and variations in capping procedures. For this reason, it has been proposed to form crown liners having a cellular annular sealing ring and a clear transparent panel portion by employing two different compositions, one for the sealing ring which contains a gas or blowing agent and is cellular upon fluxing and another for the panel which is solid, i.e. non-cellular upon fluxing. Though gaskets produced in this manner exhibit both good sealing performance and good panel clarity, it would be desirable to prepare gaskets with a cellular sealing ring and a clear, "see-through" panel in a simpler and more convenient manner without the use and application of two separate compositions.

According to the present invention, it has now been found that gaskets providing excellent seals and having the panel clarity necessary for use in lithographed crowns can be readily produced from a single composition by using a plastisol having certain flow characteristics and containing a particular level of blowing agent and by spin lining the plastisol into a configuration such that the panel portion of the fluxed gasket is not more than 20 mils thick and the integral annular sealing ring is at least 30 mils thick. More specifically, the present invention provides an improvement over conventional methods of preparing cellular spun-lined closure gaskets which comprises depositing on the inner surface of the closure a measured amount of a plastisol composition having a Brookfield viscosity between about 250 and 2000 centipoises at 110° F. and 60 r.p.m. and containing between 0.3 and 0.7% by weight of a solid chemical blowing agent based on the weight of the composition, and rotating the closure containing the deposited plastisol whereby a thin film is formed coextensive with the central portion of the closure panel integrated with a thick annular ring, the speed of rotation of the closure being sufficient to yield a fluxed cellular gasket composed of a tarnsparent panel having a thickness of not more than 20 mils and a ring having a thickness of at least 30 mils.

The method of the present invention will be more clearly understood from a reference to the attached drawing and discussion relating thereto:

FIGURE 1 schematically illustrates the present method of forming gasketed closures.

Figure 2:
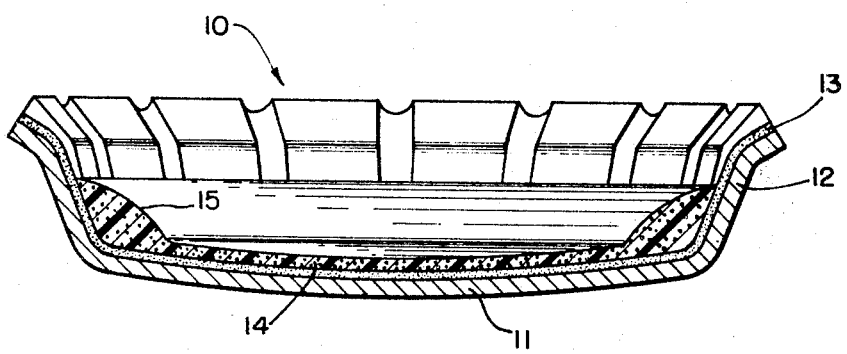

FIGURE 2 shows in axial cross-section a gasketed closure prepared according to the method of FIGURE 1.

FIGURE 1 shows the successive steps employed in preparing the fluxed cellular plastisol gasket. A measured amount of a plastisol composition, which is described below, is deposited into an inverted crown closure. The closure containing the plastisol deposit is then rotated at high speeds to distribute the composition across the inner surface of the closure to give a thin layer of composition coextensive with the top panel of the closure and a substantially thicker layer of composition disposed on the annular sealing area adjacent the skirt. The closure carrying the shaped deposit is then heated at elevated temperatures for a time sufficient to completely flux the plastisol composition and decompose the blowing agent.

FIGURE 2 is an axial sectional view of a gasketed crown closure shown in inverted position relative to its placement on the container and produced according to the steps illustrated in FIGURE 1. The completed closure, generally designated at 10, comprises a crown closure shell having a circular top panel 11 and integral crimped skirt 12 depending from the periphery of the panel. The inner surface of the shell has a lacquer coating 13 and a cellular fluxed vinyl resin liner is adhered thereto consisting of a thin central portion 14 and a thick annular sealing ring 15.

The dimensions of the finished gasket with respect to thickness, and also to void volume of the fluxed gasket are critical for achieving both transparency of the panel portion together with satisfactory sealing by the annular ring. The minimum thickness of the panel portion may be a few mils or less so long as there is a continuous, pinhole-free film covering the panel of the closure to reinforce the lacquer coating and further protect the metal from corrosion. However, for obtaining good clarity, the panel portion of the fluxed gasket should not exceed 20 mils, and for obtaining good sealing, the annular ring should be at least 30 mils thick, and preferably between 35 and 70 mils thick. The average void volume of the overall gasket (panel plus ring) should not exceed 45% and the void volume of the annular ring at this average should range between 45 and 55%. Preferably, the average void volume of the overall gasket is between 30 and 45% since at this level both good clarity and good sealing are assured.

The plastisols used in carrying out the present invention contain as basic ingredients, a vinyl resin, a plasticizer therefor, and a blowing agent. The resins suitable for use include dispersion, i.e. plastisol grade resins as conventionally prepared by emulsion polymerization followed by spray drying. Typical of the resins which may be used are homopolymers of vinyl chloride and copolymers of vinyl chloride with up to 10% and preferably less than 5% by weight of an ethylenically unsaturated monomer copolymerizable therewith e.g. acrylonitrile, vinyl acetate, dialkyl maleates and vinylidene chloride. If desired, blending resins such as those made by suspension polymerization can be used in admixture with the dispersion resin in amounts up to about 30% of the total resin used. The blending resin like the dispersion resins may be homopolymers of vinyl chloride or copolymers of vinyl chloride containing minor amounts of vinyl acetate or other copolymerizable comonomer.

Among the plasticizers which may be used in preparing the plastisol compositions are dialkyl phthalates, such as dioctyl phthalate, butyl decyl phthalate, octyl decyl phthalate; alkyl phthalyl alkyl glycolates, such as butyl phthalyl butyl glycolate, methyl phthalyl ethyl glycolate; and dialkyl esters of alkane dicarboxylic acids, such as dioctyl and dibutyl sebacates, dioctyl azelate, and diisobutyl adipate. Other plasticizers which may be employed include trialkyl and triaryl phosphates, acetyl trialkyl citrates, alkyl esters of higher fatty acids, epoxy derivatives and polymeric polyester plasticizers, such as glycol sebacate polyesters. If desired, mixtures of plasticizers may be employed including one or more primary plasticizers and blends of primary and secondary plasticizers.

As the blowing agent, it is desirable to use a compound that decomposes rapidly at the fluxing temperature of the plastisol since a rapid rate of gas evolution aids in the formation of a uniform and small cell structure. Among the blowing agents which may be employed are sodium bicarbonate, ammonium bicarbonate, azodicarbonamide, 3,3′-disulphonhydrazido diphenylsulphone, dinitrosopentamethylenetetramine, and p,p′-oxybisbenzene sulphonyl hydrazide. For present purposes, nitrogen-evolving compounds are preferred, especially diazocarbonamide.

Besides the basic ingredients, the compositions may contain heat-light stabilizers, thickeners, waxes and other modifiers. Thickeners are useful in adjusting the viscosity characteristics of the composition while waxes help to prevent the formation of oversized bubbles as the blowing agent decomposes. Though these and other modifiers may be used, the particular materials selected should be restricted to those which do not impair the clarity or transparency of the fluxed composition.

Suitable stabilizers include calcium stearate, zinc stearate, organo-tin complexes and epoxidized oils. Waxes which may be employed include long chain fatty acid amides, paraffin and microcrystalline waxes while suitable thickeners include silica aerogel and aluminum stearate.

As to proportions of ingredients, the blowing agent should be used in amounts between 0.3 and 0.7% and preferably between 0.5 and 0.6% by weight of the total composition to provide the desired void volume of between 30 and 45%. This void volume is essential for obtaining proper sealing while still permitting good clarity in the panel portion of the gasket at thicknesses of 20 mils or less.

The proportions of the other ingredients used may vary over a relatively wide range. For example, the plasticizer may be used in amounts between about 70 and 100 parts by weight of resin. Though the amount of plasticizer present has the greatest effect on the viscosity of the composition, the particular amount of plasticizer used will also depend upon the presence of thickeners and other ingredients which influence the viscosity of the composition. For obtaining the desired gasket configuration at standard spin-lining speeds where the chuck is rotated at 1500 to 5000 r.p.m., the viscosity of the composition should be between 250 and 2000 centipoises at 110° F. and 60 r.p.m. and between 700 and 5000 centipoises at 110° F. and 6 r.p.m. (Brookfield Model LVF–5X). When stabilizers, waxes and thickeners are employed, they are used in conventional amounts to achieve the desired effect. As based on 100 parts by weight resin, the stabilizers, waxes and thickeners are generally used in amounts ranging between 0.5 and 2, 3 and 6, and 0.2 and 2 parts by weight respectively.

The quantity of plastisol composition used in preparing gaskets according to the present method will vary according to the size of the closure being lined and will also depend somewhat upon the viscosity of the composition. For short skirt crowns, the quantity of plastisol used broadly ranges between about 200 and 350 milligrams per crown. With compositions having a viscosity between about 250 and 1000 centipoises, the amount used is preferably between 250 and 260 milligrams per crown. At these levels, fluxed cellular gaskets are obtained which have a ring thickness between 30 and 70 mils at panel thicknesses of 20 mils or less. At least about 50 percent of the compound is located in the sealing ring or beyond a diameter of about 0.85 inch in short skirt crowns which have a skirt height of about 0.222 to 0.234 inch and an inside diameter of 1.053 to 1.056 inches.

As indicated above, the plastisol deposit is shaped into a thin film covering the panel portion of the crown and an integral substantially thicker ring in the annular sealing area of the closure by rotating the closure carrying the deposit at speeds between about 1500 and 5000 r.p.m. Thereafter, the closure containing the shaped deposit is placed in an oven, or the deposit is heated in any other suitable and convenient manner to completely flux the plastisol and decompose the blowing agent. For achieving proper fusion and blowing of the mass, the composition should be heated at or slightly above its fusion temperature. Heating the lined closures for one to two minutes in an oven maintained between 350° and 440° F. has been found satisfactory.

The following examples are given to further illustrate the present invention. All quantities are in parts by weight unless otherwise specified.

Example 1

Ingredients: Parts by weight
- Polyvinyl chloride resin (plastisol grade resin) 100.0
- Dioctyl phthalate (plasticizer) 72.0
- Paraffin wax-melting range 120–131° F. 3.4
- Zinc/Calcium stearates in epoxidized soybean oil (stabilizer) 0.5
- Silica aerogel (thickener) 0.25
- Azodicarbonamide (blowing agent) 0.5

A wax-plasticizer blend was formed by melting the wax in a few parts of the plasticizer at a temperature of approximately 130° F. The hot wax blend was then mixed with about half the plasticizer, and the resulting mixture was stirred and allowed to cool to about 110° F.

A blowing agent blend and a thickener blend were also prepared by dispersing the azodicarbonamide in a few parts of plasticizer and by dispersing the silica in a few parts of plasticizer. These blend were then added to the cooled wax mixture with stirring together with the resin. The remaining plasticizer was added and the composition stirred until a homogeneous mixture was obtained. The viscosity of the resulting composition was about 1500 centipoises at 60 r.p.m. and 2750 centipoises at 6 r.p.m. as measured on a Brookfield viscosimeter (Model LVF–5X) at 110° F. using a No. 3 spindle.

Measured amounts of between about 250 and 260 milligrams and between about 350 and 375 milligrams of the above composition were used to prepare gasketed closures using commercial automatic high speed lining machinery. The closures employed were short skirt crowns having printed matter lithographed on the inner surface of the closure panel and were internally coated with a standard vinyl lacquer as conventionally used to protect the metal shell from corrosion and to promote adhesion between the gasket and the metal. The temperature of the composition as it was delivered to the closures was 110° F. The closures when lined were at room temperature though, if desired, the closures may be preheated to about the lining temperature of the plastisol.

Lining of the crowns was carried out at a chuck speed of about 2,800 r.p.m. at a standard lining rate of about 600 crowns per minute. After spin-lining, the crowns carrying the shaped deposits were placed in an oven maintained at a temperature of 440° F. for about one minute to decompose the blowing agent and flux the composition.

All of the gaskets obtained had an excellent sealing configuration characterized by a well-defined annulus and a thin-panel portion which was substantially clear and transparent so that the printed matter on the crown panel was readily discerned visually. When the crown containing these gaskets were applied to carbonated packs using standard crimping procedures, excellent sealing was obtained.

At initial film weights between 350 and 375 milligrams, the resulting gaskets had a panel thickness ranging between about 17 and 19 mils and a ring thickness between about 50 and 60 mils. The gaskets produced from initial film weights between 250 and 260 milligrams had a panel thickness of about 13 to 16 mils and a ring thickness between about 30 and 45 mils. The average void volume of the fluxed gasket was between about 30 and 35%.

EXAMPLES 2 AND 3

| Ingredients | Parts by weight | |
|---|---|---|
| | Example 2 | Example 3 |
| Polyvinyl chloride resin (plastisol grade resin) | 100 | 90 |
| Polyvinyl chloride resin (suspension grade resin) | | 10 |
| Dioctyl phthalate | 80 | 80 |
| Paraffin wax, melting range 120–131° F | 3.4 | 3.4 |
| Zinc/calcium stearates in epoxidized soybean oil | 0.5 | 0.5 |
| Silica aerogel | 0.25 | 0.25 |
| Azodicarbonamide (blowing agent) | 1.0 | 1.0 |

The compositions of Examples 2 and 3 were prepared in the same manner described in Example 1 above. The viscosity of the composition of Example 2 was about 550 centipoises and the viscosity of Example 3 about 450 centipoises as measured at 110° F. and 60 r.p.m. using a No. 2 spindle (Brookfield Model LVF–5X). The viscosities at 110° F. and 6 r.p.m. were about 1950 and 750 centipoises, respectively.

Measured amounts of between about 250 and 260 milligrams of Examples 2 and 3 were used to prepare fluxed cellular gaskets acocrding to the procedure described in Example 1 above except that the lined closures were fluxed for one minute at 415° F.

As with the composition of Example 1, the gaskets prepared from Examples 2 and 3 had a well-defined sealing annulus and a thin central panel portion with good clarity and transparency so that the printed matter on the inner surface of the closure panel was readily visible. In the fluxed gaskets prepared from both of these examples, the panel portion of the gasket was about 13 to 16 mils thick and the ring between about 35 and 50 mils thick. The average void volume for both compositions in their fluxed state ranged between 35 and 45% with the void volume in the annular ring ranging between about 45 and 55%.

From the above examples and results obtained, it is readily aparent that fluxed cellular plastisol gaskets having the "see-through" characteristics necessary for closures carrying printed material on the inner panel surface can be simply and conveniently prepared from a single plastisol composition provided the viscosity of the composition and quantity of blowing agent are maintained within the specified ranges and the ultimate configuration of the fluxed gasket is such that the panel portion is no more than 20 mils thick and the annular sealing ring at least 30 mils thick. The annular ring due to its cellular structure is sufficiently compressible to establish good seals on irregular glass finishes while possessing the resilience necessary for maintaining a satisfactory seal over prolonged periods. The panel, through also having a cellular structure, possesses the requisite clarity and transparency for use in lithographed closures at the specified thickness and void volume.

We claim:

1. In a method of forming a cellular fluxed plastisol gasket in a closure having a circular top panel and a skirt depending from the periphery of said panel which includes the essential steps of depositing a predetermined amount of plastisol of a vinyl resin containing a heat-activatable blowing agent on the inner surface of the closure, rotating the closure containing the plastisol deposit to spread the deposit over the inner surface of the closure and thereafter heating the deposit at a temperature and for a time sufficient to completely flux the plastisol and decompose the blowing agent, the improvement which comprises depositing on the inner surface of the closure a measured amount of a plastisol composition having a Brookfield viscosity between about 250 and 2000 centipoises at 110° F. and 60 r.p.m. and containing between 0.3 and 0.7% by weight of a gas-evolving thermally-decomposable blowing agent based on the weight of the composition, said composition being devoid of ingredients which would impair the transparency of the resulting gasket when the composition is fluxed, rotating the closure containing the deposited plastisol at a speed ranging between about 1500 and 5000 r.p.m. whereby a thin film having a thickness of not more than 20 mils is formed coextensive with the central portion of the closure panel integrated with a thick annular ring having a thickness of at least 30 mils, and fluxing the composition in the closure whereby a cellular gasket is formed having an overall void volume not exceeding 45% and a transparent panel portion.

2. In a method according to claim 1 wherein the panel thickness of the fluxed gasket is between about 13 and 19 mils and the thickness of the annular ring is between about 30 and 70 mils.

3. In a method according to claim 2 wherein the viscosity is between about 300 and 700 centipoises, the amount of blowing agent is about 0.55% by weight and the panel thickness of the fluxed gasket is between 13 and 16 mils and the ring thickness is between 35 and 50 mils.

4. In a method according to claim 3 wherein the plastisol comprises 100 parts by weight of polyvinyl chloride resin, about 80 parts by weight of dioctyl phathalate, 3.4 parts by weight of paraffin wax, 0.5 part by weight of zinc-calcium stearate, 0.25 part by weight of silica aerogel and 1.0 part by weight of azodicarbonamide.

References Cited

UNITED STATES PATENTS

| | | | |
|---|---|---|---|
| 1,413,332 | 4/1922 | Hooper | 264—311 XR |
| 2,671,932 | 3/1954 | Pique | 264—311 XR |
| 3,032,826 | 5/1962 | Brillinger | 264—45 |
| 3,265,785 | 8/1966 | Rainer | 264—45 |

FOREIGN PATENTS 553,037   12/1956   Belgium.

PHILIP E. ANDERSON, *Primary Examiner.*

U.S. Cl. X.R.

215—39; 264—54, 311